(12) United States Patent
Ye et al.

(10) Patent No.: US 7,888,884 B2
(45) Date of Patent: Feb. 15, 2011

(54) BACKLIGHT UNIT AND LIQUID CRYSTAL DISPLAY DEVICE HAVING THE SAME

(75) Inventors: Byoung-dae Ye, Yongin-si (KR);
Sang-hoon Lee, Yongin-si (KR); Ho-sik Shin, Bucheon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 199 days.

(21) Appl. No.: 12/356,914

(22) Filed: Jan. 21, 2009

(65) Prior Publication Data

US 2009/0134815 A1 May 28, 2009

Related U.S. Application Data

(63) Continuation of application No. 11/777,375, filed on Jul. 13, 2007, now Pat. No. 7,511,435.

(30) Foreign Application Priority Data

Jul. 28, 2006 (KR) ................. 10-2006-0071671

(51) Int. Cl.
*G05F 1/00* (2006.01)

(52) U.S. Cl. .............. 315/291; 315/312; 315/224; 315/247; 315/295; 315/307; 315/DIG. 4; 345/102; 345/52; 345/39; 345/42; 345/77

(58) Field of Classification Search ............. 315/291, 315/224, 247, 312, 294, 295, 300, 263, 307, 315/DIG. 4; 345/39, 42, 52, 77, 82, 87, 89, 345/102

See application file for complete search history.

(56) References Cited

U.S. PATENT DOCUMENTS

| 7,180,252 | B2* | 2/2007 | Lys et al. ................. 315/312 |
| 7,417,616 | B2* | 8/2008 | Min et al. ................. 345/102 |
| 2003/0214478 | A1* | 11/2003 | Yoo et al. ................. 345/102 |
| 2007/0229446 | A1* | 10/2007 | Oh et al. ................. 345/102 |
| 2007/0296354 | A1* | 12/2007 | Okabe ................. 315/307 |
| 2008/0088550 | A1* | 4/2008 | Kim et al. ................. 345/82 |
| 2008/0204395 | A1* | 8/2008 | Kang et al. ................. 345/102 |

FOREIGN PATENT DOCUMENTS

| JP | 2001142409 | 5/2001 |
| JP | 2004246117 | 9/2004 |
| KR | 1020040096186 A | 11/2004 |

* cited by examiner

*Primary Examiner*—Haissa Philogene
(74) *Attorney, Agent, or Firm*—F. Chau & Associates, LLC

(57) ABSTRACT

A backlight unit includes: a power supplying part; a non-dimming point light source receiving power from the power supplying part and providing a feed back signal to the power supplying part; a dimming control part outputting a dimming signal; and a plurality of dimming point light sources receiving power from the power supplying part, and receiving the dimming signal from the dimming control part.

14 Claims, 5 Drawing Sheets

BACKLIGHT UNIT AND LIQUID CRYSTAL DISPLAY DEVICE HAVING THE SAME

CROSS-REFERENCE TO RELATED APPLICATION

This is a continuation application of U.S. application Ser. No. 11/777,375, filed on Jul. 13, 2007 now U.S. Pat. No. 7,511,435, the disclosure of which is incorporated by reference herein in its entirety, and which, in turn, claims foreign priority under 35 U.S.C. §119 to Korean Patent Application No. 2006-0071671, filed on Jul. 28, 2006, which is hereby incorporated by reference for all purposes as if fully set forth herein.

BACKGROUND OF INVENTION

1. Technical Field

The present disclosure relates to a backlight unit and a liquid crystal display device having the same and, more particularly, to a backlight unit comprising a point light source, and a liquid crystal display device having the same.

2. Discussion of Related Art

Recently, flat panel display devices such as an LCD (liquid crystal display), a PDP (plasma display panel), an OLED (organic light emitting diode), and the like have been under development.

A liquid crystal display device includes a thin film transistor substrate, a color filter substrate, with a liquid crystal injected between both substrates to form a liquid crystal panel. Since the liquid crystal panel is a non-lighting element, a backlight unit for supplying light is provided in the rear of the thin film transistor substrate. Transmittance of light emitted from the backlight unit is determined by an arrangement of the liquid crystal.

A lamp as a line light source and a light emitting diode as a point light source have been widely used for the backlight unit, and local dimming that partially controls the light of a backlight unit according to a choice of a user has been applied thereto.

Generally, a light emitting diode is driven by a regulator or a pulse width modulation (PWM) integrated circuit (IC), and the like. To enlarge the size of the display device and more delicately represent a gray scale, the number of light emitting diodes should be increased and, accordingly, the backlight unit should have a plurality of power driving parts. The increase in the number of the power driving parts increases the overall cost, and raises a driving load of the backlight unit because of the requirement to control the plurality of power driving parts.

SUMMARY OF THE INVENTION

Accordingly, exemplary embodiments of the present invention provide a backlight unit and a liquid crystal display device having the same that are simply driven and that reduce the cost.

The foregoing and/or other exemplary embodiments of the present invention can be achieved by providing a backlight unit, comprising: a power supplying part; a non-dimming point light source receiving power from the power supplying part; a dimming control part outputting a dimming signal; and a plurality of dimming point light sources receiving power from the power supplying part, and receiving the dimming signal from the dimming control part.

According to an exemplary embodiment of the present invention, the non-dimming point light source and the dimming point light sources are connected in parallel.

According to an exemplary embodiment of the present invention, the non-dimming point light source and the dimming point light sources comprise one of a light emitting diode, a laser diode and a carbon nano tube.

In an exemplary embodiment of the present invention, each dimming point light source emits a white light.

In an exemplary embodiment of the present invention, the backlight unit further comprises a switching part connected to the dimming point light sources to dim the dimming point light sources depending on the dimming signal.

According to an exemplary embodiment of the present invention, the backlight unit further comprises a fuse connected in series to the dimming point light sources.

According to an exemplary embodiment of the present invention, a plurality of the non-dimming point light sources are provided.

In an exemplary embodiment of the present invention, the plurality of non-dimming point light sources are connected in series.

In an exemplary embodiment of the present invention, the plurality of non-dimming point light sources are connected in parallel.

According to an exemplary embodiment of the present invention, the plurality of dimming point light sources are connected in parallel.

In an exemplary embodiment of the present invention, the backlight unit further comprises at least one dimming point light source set comprising the plurality of dimming point light sources connected in series, wherein if a plurality of the dimming point light source sets is provided, the plurality of dimming point light source sets are connected in parallel.

The foregoing and/or other exemplary embodiments of the present invention can be achieved by providing a liquid crystal display device, comprising: a liquid crystal panel; a power supplying part; a non-dimming point light source receiving power from the power supplying part; a dimming control part outputting a dimming signal; and a plurality of dimming point light sources receiving power from the power supplying part, receiving the dimming signal from the dimming control part, and supplying light to the liquid crystal panel.

According to an exemplary embodiment of the present invention, the non-dimming point light source and the dimming point light sources are connected in parallel.

In an exemplary embodiment of the present invention, the non-dimming point light source and the dimming point light sources comprise one of a light emitting diode, a laser diode and a carbon nano tube.

According to an exemplary embodiment of the present invention, the liquid crystal display device further comprises a switching part connected to the dimming point light sources to dim the dimming point light sources depending on the dimming signal.

In an exemplary embodiment of the present invention, the liquid crystal display device further comprises a fuse connected in series to the dimming point light sources.

BRIEF DESCRIPTION OF THE DRAWINGS

Exemplary embodiments of the prevent invention will be understood in more detail from the following descriptions taken in conjunction with the accompany drawings, in which.

DETAILED DESCRIPTION OF THE EXEMPLARY EMBODIMENTS

Figure 1:
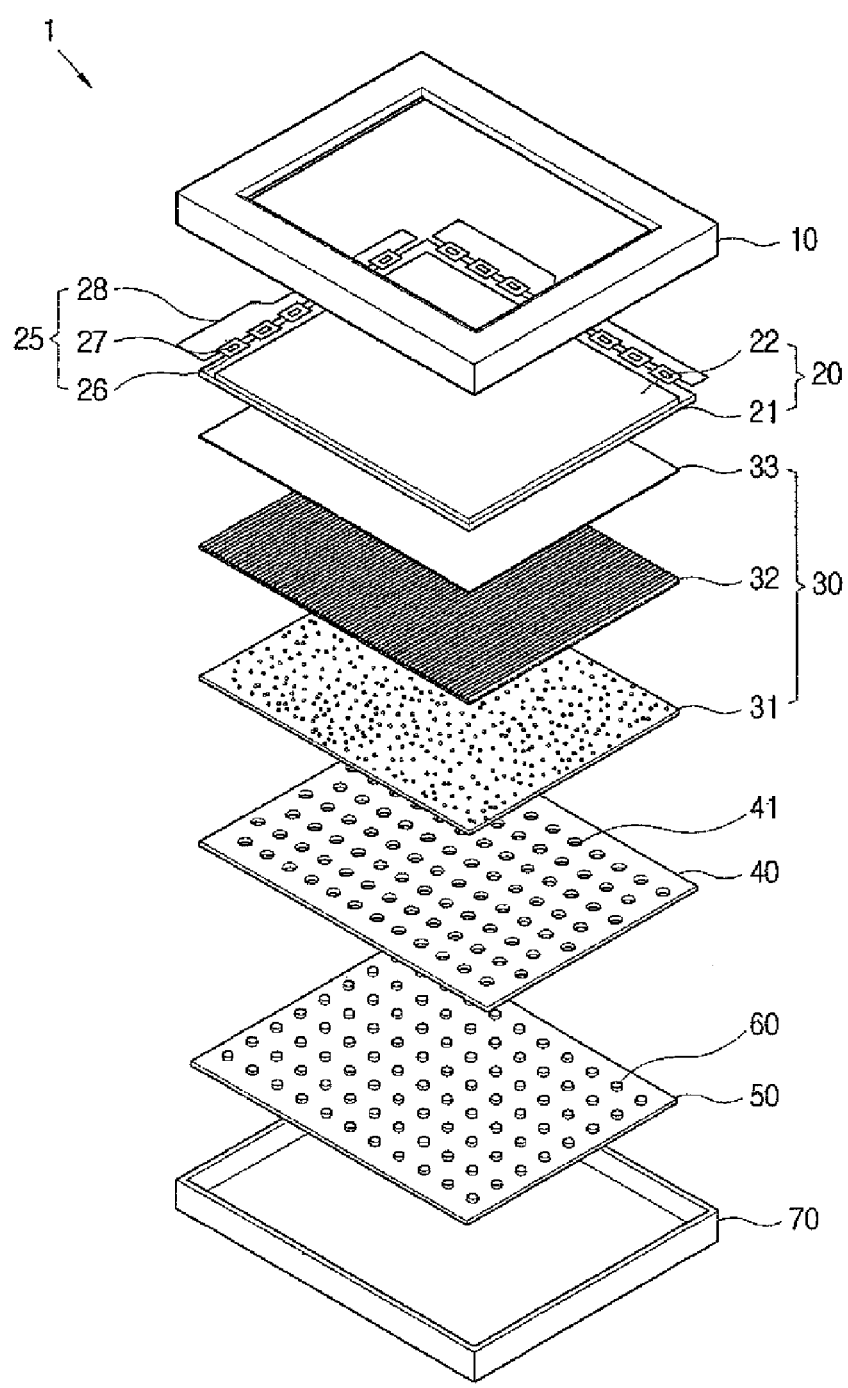
FIG. 1 is an exploded perspective view illustrating a liquid crystal display device according to an exemplary embodiment of the present invention.

Reference will now be made in detail to the exemplary embodiments of the present invention, examples of which are illustrated in the accompanying drawings, wherein like reference numerals refer to like elements throughout. The exemplary embodiments are described below so as to explain the present invention by referring to the figures.

Figure 2:
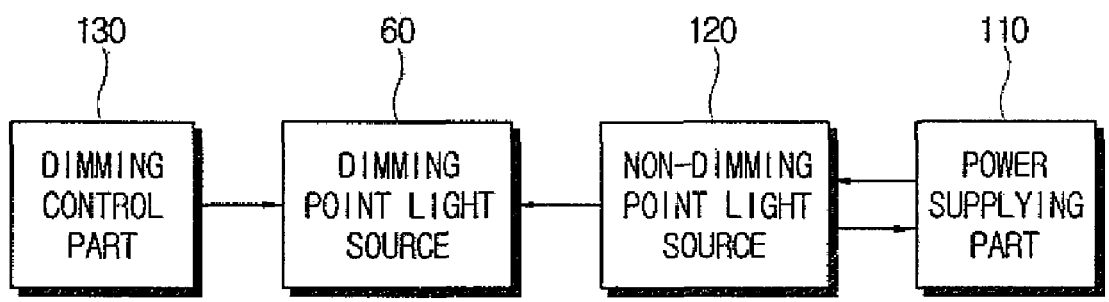
FIG. 2 is a control block diagram of the liquid crystal display device according to an exemplary embodiment of the present invention.
Figure 3:
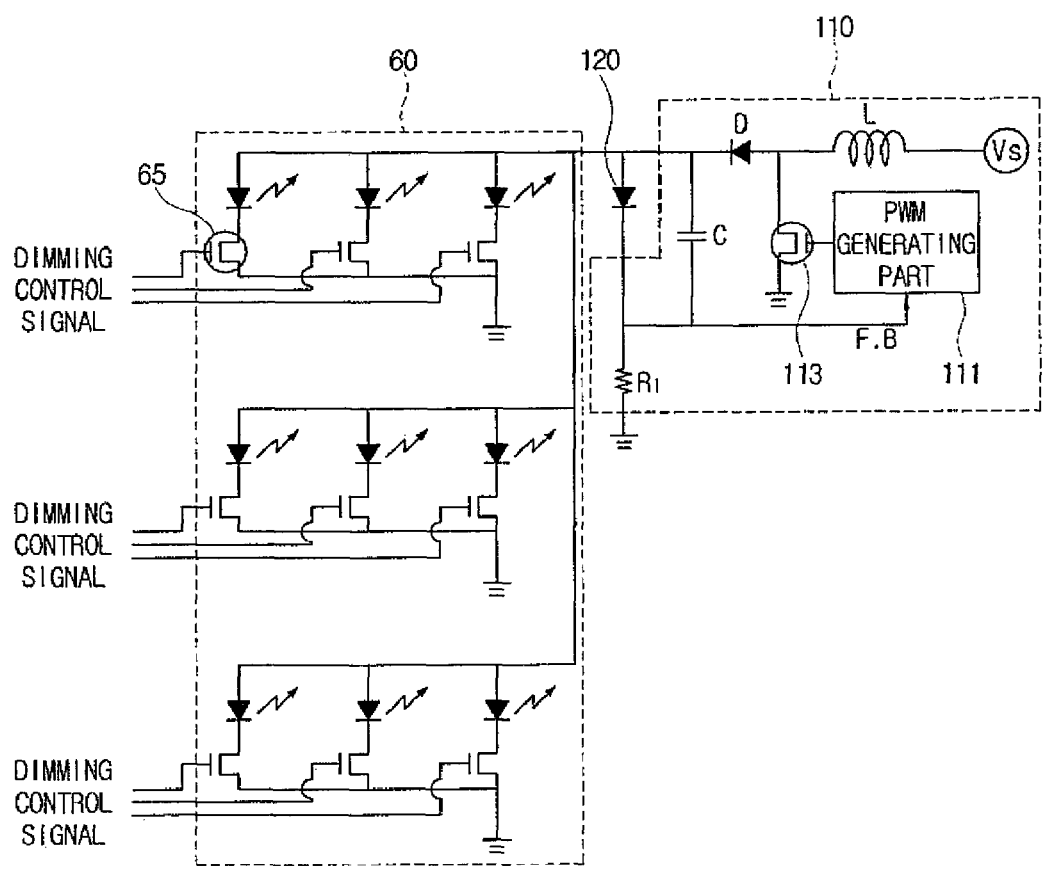
FIG. 3 is a schematic circuit diagram of the liquid crystal display device according to an exemplary embodiment of the present invention.

As shown in FIGS. 1 to 3, a liquid crystal display device 1 according to an exemplary embodiment of the present invention includes a liquid crystal display panel 20, a light adjusting member 30 positioned to a rear surface of the liquid crystal display panel 20, a reflecting plate 40, a dimming point light source circuit substrate 50, and a dimming point light source 60 mounted on the dimming point light source circuit substrate 50 and positioned to be aligned with a point light source accommodating hole 41 of the reflecting plate 40. The dimming point light source 60 comprises an LED (light emitting diode) that is mounted on the dimming point light source circuit substrate 50 and supplying light to the liquid crystal display panel 20. It will be seen that there are a number of dimming point light sources 60 on the dimming point light source substrate 50.

The liquid crystal display panel 20, the light adjusting member 30 and the dimming point light source circuit substrate 50 are accommodated between an upper chassis 10 and a lower chassis 70.

The liquid crystal display panel 20 includes a first substrate 21 formed with thin film transistors, a second substrate 22 facing the first substrate 21 and formed with a color filter layer, a sealant (not shown) assembling both substrates 21 and 22 so as to form a cell gap, and a liquid crystal layer (not shown) positioned in the gap between both substrates 21 and 22 and the sealant. A black matrix is formed to the second substrate 22 to prevent external light from entering the thin film transistors as well as the color filter layer.

The liquid crystal panel 20 is provided in a rectangular shape having a long side and a short side. The liquid crystal panel 20 adjusts an arrangement of the liquid crystal layer to form an image. Since the liquid crystal panel 20 is a non-lighting element, the liquid crystal panel 20 should be supplied with light from the dimming point light source 60 positioned behind the liquid crystal panel 20. A driving part 25 is provided to a side of the first substrate 21 to supply a driving signal. The driving part 25 includes an FPC (flexible printed circuit) 26, a driving chip 27 mounted on the FPC 26, and a PCB (printed circuit board) 28 connected to a side of the FPC 26. The driving part 25 comprises a COF (chip on film). Alternatively, the driving part 25 may comprise a TCP (tape carrier package), a COG (chip on glass) or some other known types. Alternatively, the driving part 25 may be formed to the first substrate 21 in a wiring-line forming process.

The light adjusting member 30 positioned to a rear side of the liquid crystal display panel 20 may include a diffusing plate 31, a prism film 32 and a passivation film 33.

The diffusing plate 31 includes a base plate, and a coating layer comprising beads formed on the base plate. The diffusing plate 31 diffuses light supplied from the dimming point light source 60 to make the overall brightness uniform.

The prism film 32 is formed with triangular prisms uniformly arranged in an upper surface thereof. The prism film 32 collects light diffused through the diffusing plate 31 in a perpendicular direction with respect to a plane of the liquid crystal display panel 20 positioned above. The prism film 32 is typically provided in a pair, and a micro prism formed to the prism film 32 has a predetermined angle. Most of the light passing through the prism film 32 travels perpendicularly to the plane of the liquid crystal display panel 20, to thereby render uniform the brightness distribution. Alternatively, a reflecting polarizing film (not shown) may be provided together with the prism film 32 as necessary. Alternatively, only the reflecting polarizing film may be provided without the prism film 32 as necessary.

The passivation film 33 is positioned uppermost and protects the prism film 32 because it is liable to be scratched.

The reflecting plate 40 is provided to a part of the dimming point light source circuit substrate 50 on which the dimming point light source 60 is not mounted. The reflecting plate 40 is provided with the point light source accommodating holes 41 that correspond to an arrangement of the dimming point light sources 60. The size of the point light source accommodating hole 41 may be slightly bigger than the dimming point light source 60.

The reflecting plate 40 reflects light emitted downward to supply the light to the diffusing plate 31. The reflecting plate 40 may be formed of PET (polyethylene terephthalate) or PC (poly carbonate), and may be coated with silver or aluminum. The reflecting plate 40 may have a sufficient thickness so as not to be wrinkled by the appreciable heat generated from the dimming point light source 60.

The dimming point light source circuit substrate 50 has the same rectangular shape as the liquid crystal display panel 20. The dimming point light source 60 is formed to a first surface of the dimming point light source circuit substrate 50 facing the liquid crystal display panel 20. As shown in FIG. 2, power driving parts 110, 120 and 130 for driving the dimming point light source 60 may be mounted on a second surface of the dimming point light source circuit substrate 50. Alternatively, the power driving parts 110, 120 and 130 may be positioned to a rear surface of the lower chassis 70. The power driving parts 110, 120 and 130 include a non-dimming point light source 120, a power supplying part 100 and a dimming control part 130.

Since the dimming point light source 60 generates a lot of heat, the dimming point light source circuit substrate 50 may be mainly formed of aluminum with good thermal conductivity. The liquid crystal display device 1 may further include a heat pipe, a radiating fin, a cooling fan, and the like to facilitate heat radiation. Alternatively, the dimming point light source circuit substrate 50 may have other shapes. The dimming point light source circuit substrate 50 may have a bar shape extending along a long side direction of the liquid crystal display panel 20.

The dimming point light source 60 is mounted on the dimming point light source circuit substrate 50, and is disposed throughout the rear surface of the liquid crystal display panel 20. The dimming point light source 60 comprises a singular point light source emitting white light. Alternatively, the dimming point light source 60 may comprise three dimming point light sources respectively emitting red, green and blue lights to form together a white light emitting group. Eleven dimming point light sources 60 are arranged in a row paralleling the long side of the dimming point light source circuit substrate 50, and eight rows each comprising eleven dimming point light sources 60 are formed in total. The dimming point light source 60 includes a chip (not shown) emitting light, a lead (not shown) connecting the chip and the dimming point light source circuit substrate 50, a plastic mold (not shown) accommodating the lead and surrounding the chip, and a silicon adhesive (not shown) and a bulb (not shown) positioned to an upper part of the chip.

The dimming point light source 60 comprises a light emitting diode as a point light source. Alternatively, the dimming point light source 60 may comprise either a laser diode or a carbon nano tube as a point light source. Alternatively, the dimming point light source 60 may comprise a short lamp as a point light source, although the driving method therefor is different.

As shown in FIG. 2, the liquid crystal display device 1 includes the non-dimming point light source 120 and the power supplying part 110 for driving the dimming point light source. The liquid crystal display device 1 further includes the dimming control part 130 applying a predetermined dimming signal to the dimming point light source 60.

A dimming signal that the dimming control part 130 outputs comprises a dimming signal that a user inputs to totally adjust the brightness of the liquid crystal display panel 20, or a dimming signal for a local dimming that partially adjusts the brightness of a plurality of dimming point light sources 60. The dimming signal outputted from the dimming control part 130 is inputted to each dimming point light source 60. The dimming point light sources 60 may be individually adjusted by the dimming signal. Alternatively, the dimming point light sources 60 are divided into a plurality of groups, and the same dimming signal may be applied to all of the dimming point light sources 60 of the group. The dimming control part 130 may supply the dimming point light source 60 with the dimming signal corresponding to an image signal supplied to the liquid crystal display panel 20 to be in synchronism with the image signal. The brightness of the dimming point light source 60 is increased for a part of an image having a high brightness, and the brightness of the dimming point light source 60 is decreased for a part of an image having a low brightness.

The dimming control part 130 supplies only the dimming signal to the dimming point light sources 60, and power for driving the dimming point light source 60 is supplied by the non-dimming point light source 120 and the power supplying part 110.

As shown in FIG. 3, the plurality of dimming point light sources 60 are connected in parallel with one another, and the non-dimming point light source 120 is also connected with the dimming point light source 60 in parallel. The power supplying part 110 connected with the non-dimming point light source 120 supplies power to the dimming point light source 60 by using the non-dimming point light source 120.

The non-dimming point light source 120 comprises a light emitting diode having the same standard as the dimming point light source 60. While the dimming point light source 60 supplies light to the liquid crystal display panel 20, the non-dimming point light source 120 is employed for adjusting the power supplied to the dimming point light source 60. That is, the power supplying part 110 supplies power to the non-dimming point light source 120 that is fed back, so that the dimming point light source 60 can be supplied with a proper power.

The power supplying part 110 includes a power source Vs, a PWM generating part 111 and a switching part 113. The power supplying part 110 further includes a coil L accumulating power depending upon on and off states of the switching part 113 to raise the voltage, a diode D for smoothing the power, a capacitor C stabilizing the power by acting as a filter, and a current sensing resistor R1 for sensing the current flowing through the non-dimming point light source 120.

The switching part 113 regulates the current supplied from the power source Vs to the non-dimming point light source 120. The switching part 113 preferably comprises a MOSFET (metal oxide semiconductor field effect transistor) turned on and off depending on a PWM control by the PWM generating part 111.

The PWM generating part 111 controls the switching part 113 by a PWM control, so that the non-dimming point light source 120 is supplied with a uniform driving power enabling the brightness of the non-dimming point light source 120 to be maintained depending on a predetermined ordered value. If a feedback current sensed through the current sensing resistor R1 exceeds a predetermined reference value, the duty ratio between the on and off of the switching part 113 is adjusted.

If the feedback current is larger than the reference value, a smaller power level than an existing power level is supplied to the non-dimming point light source 120. To be more specific, the width of a turn-on pulse supplied to the switching part 113 is reduced. That is, the PWM generating part 111 outputs a PWM control signal reducing the duty ratio of the switching part 113. On the other hand, if the feedback current is smaller than the reference value, the PWM generating part 111 increases the width of the turn-on pulse of the switching part 113.

The power supplying part 110 may further comprise a controller (not shown) that sends a predetermined ordered value to the PWM generating part 111 and compares the feedback current sensed through the current sensing resistor R1 with the reference current in order to output a control signal based on the compared results.

The power supplying part 110 may further include other known configurations and may comprise a regulator instead of the PWM generating part 111.

Power outputted from the power supplying part 110 is supplied to both the non-dimming point light source 120 and the plurality of dimming point light sources 60 that are connected in parallel, but only the feedback current from the non-dimming point light source 120 is sensed to control the power of the non-dimming point light source 120. If the power of the non-dimming point light source 120 is controlled, power of the dimming point light sources 60 connected in parallel becomes controlled. Accordingly, the power of all dimming point light sources 60 can be controlled by using one non-dimming point light source 120 representing the dimming point light sources 60 without a separate power supplying part 130 for supplying power to each of the dimming point light sources 60 to which a dimming signal is to be applied.

In the conventional display device, since the power supplying part 110, separately including the PWM generating part 111, is provided for one dimming point light source 60, a lot of power supplying parts 130 will become necessary as the number of point light sources used as a light source increases. Also, in the case that one power supplying part supplies power to a plurality of the dimming point light sources 60, the diode D, the coil L and the capacitor C provided to the power supplying part should have such capacities as to correspond to a plurality of point light sources. The power supplying part 110 according to the present invention, however, includes the diode D, the coil L and the capacitor C having such capacities so as to control the power of only the non-dimming point light source 120. Accordingly, the dimming point light sources 60 connected in parallel with the non-dimming point light source 120 can be driven by the power supplying part 110 with a required capacity significantly reduced compared with the conventional display device.

A dimming switch 65 is separately connected to each dimming point light source 60, and a dimming signal is applied to the dimming switch 65. The dimming switch 65 is turned on and off depending on the dimming signal to adjust the amount of power supplied to the dimming point light source 60. That is, the dimming point light source 60 is dimmed by the dimming switch 65 while receiving power with a uniform level from the power supplying part 110. The dimming switch 65 preferably comprises a MOSFET (metal oxide semiconductor field effect transistor) like the switching part 113.

Figure 4:
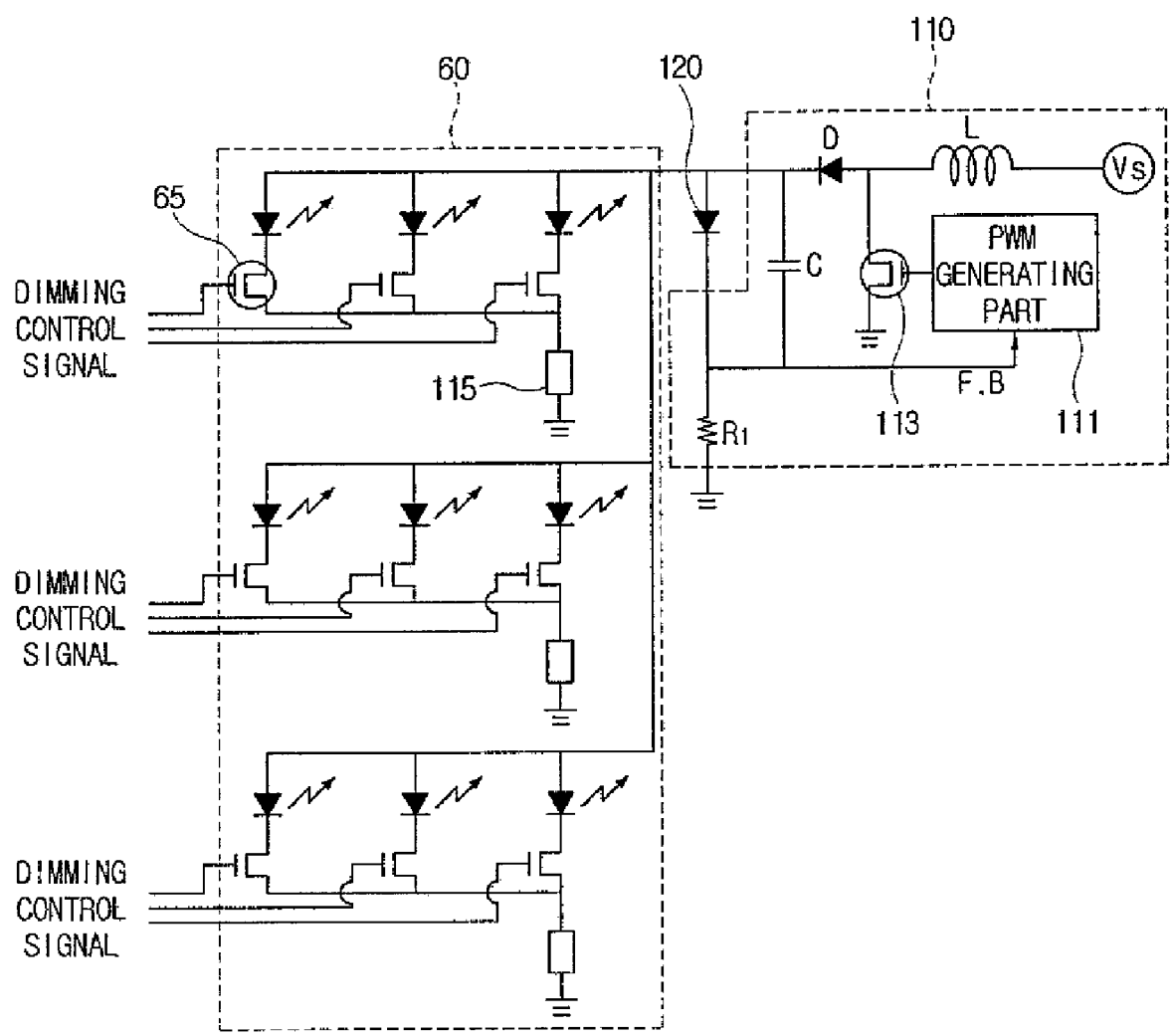
FIG. 4 is a schematic circuit diagram of a liquid crystal display device according to an exemplary embodiment of the present invention.

FIG. 4 is a schematic circuit diagram of a liquid crystal display device according to an exemplary embodiment of the present invention.

As shown therein, a power supplying part 130 according to an exemplary embodiment of the present invention further includes a fuse 115 connected to each dimming point light source 60.

The fuse 115 is connected between a ground terminal and a dimming switch 65 of the dimming point light source 60 connected most closely to the non-dimming point light source 120. Since a plurality of dimming point light sources 60 are connected to only one non-dimming point light source 120, the dimming point light source 60 may be damaged by ignition of a wire or a short circuit because of an overcurrent. The fuse 115 prevents damage to the dimming point light source 60, and interrupts current if current over a predetermined value is sensed, thereby also protecting the non-dimming point light source 120 and the power supplying part 110.

The plurality of fuses 115 are preferably connected to enhance the safety of the power supply. The fuse 115 may be connected between each dimming point light source 60 and the ground terminal. The number and the capacity of the fuse 115 may be determined depending on the number of the dimming point light sources 60 and the amount of current supplied to the dimming point light source 60.

Figure 5:
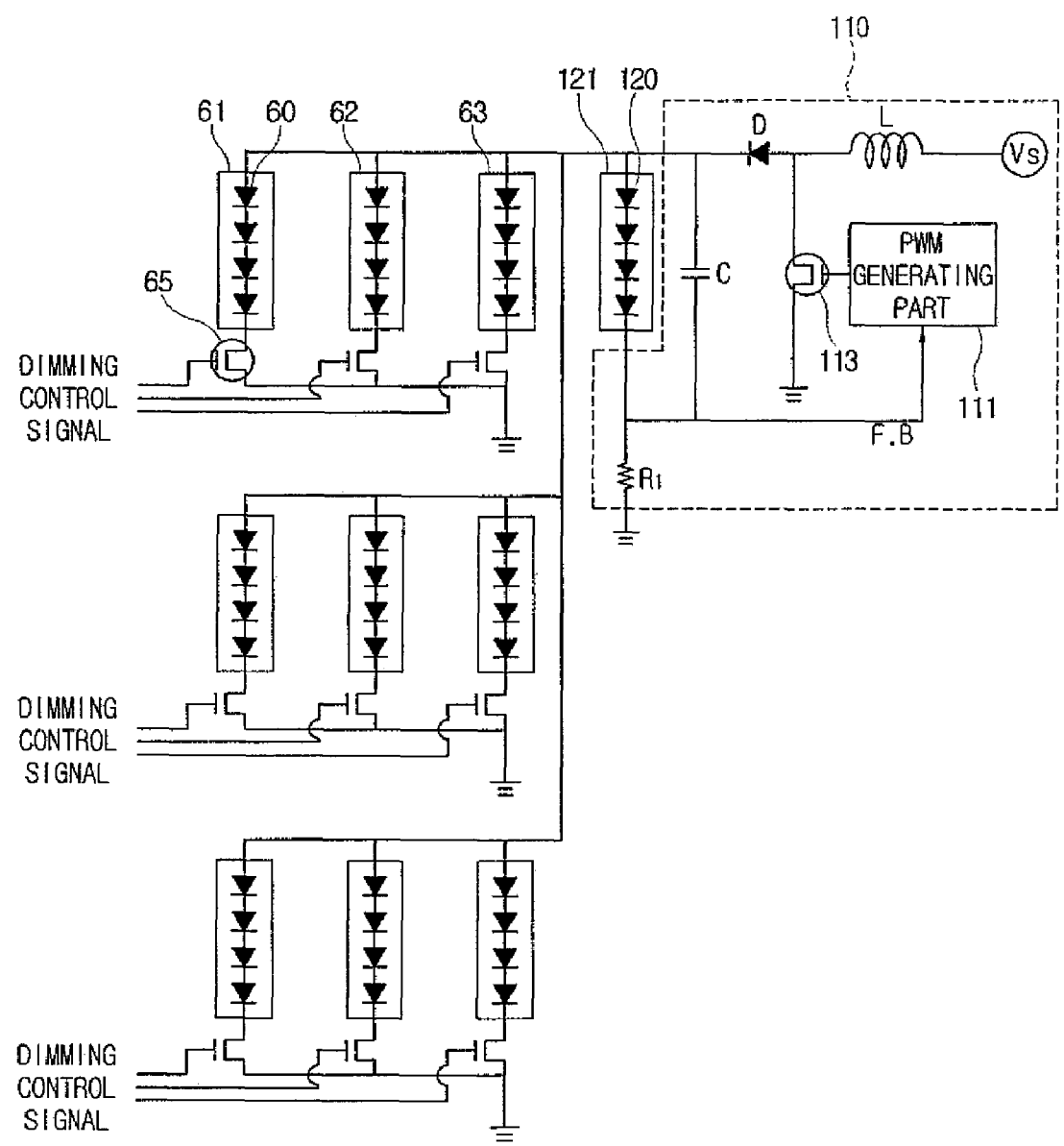
FIG. 5 is a schematic circuit diagram of a liquid crystal display device according to an exemplary embodiment of the present invention.

FIG. 5 is a schematic circuit diagram of a liquid crystal display device according to an exemplary embodiment of the present invention.

As shown therein, a liquid crystal display device according to an exemplary embodiment of the present invention includes a non-dimming point light source set 121 comprising four non-dimming point light sources 120, and a plurality of dimming point light source sets 61, 62 and 63, each comprising four series-connected dimming point light sources 60, with the sets connected in parallel.

Although being manufactured to the same standard, light emitting diodes used as a point light source have in reality, different electrical properties. In fact, there may be a significant property difference among the light emitting diodes. Accordingly, if all of the power is controlled by using a single non-dimming point light source, current may be unstably supplied to the dimming point light source. Accordingly, the liquid crystal display device according to the exemplary embodiment of FIG. 5 uses the non-dimming point light source set 121 comprising four series-connected non-dimming point light sources 120 to stably control power.

Four non-dimming point light sources 120 comprise one non-dimming point light source set 121, and the power supplying part 110 has such a capacity as to drive the four non-dimming point light sources 120. The non-dimming point light source 120 included in the non-dimming point light source set 121 may be connected in series as shown in FIG. 5, or they may be connected in parallel.

The plurality of dimming point light source sets 61, 62 and 63 connected in parallel with the non-dimming point light source set 121 respectively include four dimming point light source 60, and the four dimming point light sources 60 are connected in series. The number of the non-dimming point light sources 120 included in the non-dimming point light source set 121 is preferably the same as the number of the dimming point light sources 60 included in the dimming point light source sets 61, 62 and 63. The dimming point light sources 60 connected in a single dimming point light source sets 61, 62 and 63 are equally dimmed by a single dimming signal.

The liquid crystal display device according to an exemplary embodiment of the present invention representatively controls power supplied to the non-dimming point light source 120 connected singly or in a plurality, thereby simply supplying power to the dimming point light source 60 connected to the non-dimming point light source 120. Accordingly, configuration of the power supplying part 110 can be simplified, thereby reducing cost and simply driving a light source.

As described above, an exemplary embodiment of the present invention provides a backlight unit and a liquid crystal display device having the same simply driven and reducing cost.

Although exemplary embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A backlight unit, comprising:
   a power supplying part;
   a dimming control part outputting a dimming signal; and
   a plurality of point light source sets receiving power from the power supplying part, and receiving the dimming signal from the dimming control part and emitting light,
   wherein each of the plurality of point light source sets is mutually connected in parallel.

2. The backlight unit according to claim 1, wherein each of the plurality of point light source sets comprises a plurality of point light sources mutually connected in parallel.

3. The backlight unit according to claim 1, wherein each of the plurality of point light source sets comprises a plurality of point light sources mutually connected in series.

4. The backlight unit according to claim 1, wherein each of the plurality of point light source sets comprises a plurality of point light sources, at least one of which is selected from a group consisting of a light emitting diode, a laser diode and a carbon nano tube.

5. The backlight unit according to claim 1, wherein each of the plurality of point light source sets emits a white light.

6. The backlight unit according to claim 1, further comprising a plurality of switching parts respectively connected to the plurality of point light source sets to dim the emitted light from the plurality of point light source sets in response to the dimming signal.

7. The backlight unit according to claim 1, further comprising a fuse connected in series with a ground voltage in each of the plurality of point light source sets.

8. A liquid crystal display device, comprising:
   a liquid crystal panel;
   a power supplying part;

a dimming control part outputting a dimming signal; and a plurality of point light source sets receiving power from the power supplying part, and receiving the dimming signal from the dimming control part for supplying light to the liquid crystal panel, wherein each of the plurality of point light source sets is mutually connected in parallel.

9. The liquid crystal display device according to claim 8, wherein each of the plurality of point light source sets comprises a plurality of point light sources mutually connected in parallel.

10. The liquid crystal display device according to claim 8, wherein each of the plurality of point light source sets comprises a plurality of point light sources mutually connected in series.

11. The liquid crystal display device according to claim 8, wherein each of the plurality of point light source sets comprises a plurality of point light sources, at least one of which is selected from a group consisting of a light emitting diode, a laser diode and a carbon nano tube.

12. The liquid crystal display device according to claim 8, wherein each of the plurality of point light source sets emits a white light.

13. The liquid crystal display device according to claim 8, further comprising a plurality of switching parts respectively connected to the plurality of point light source sets to dim the light from the plurality of point light source sets in response to the dimming signal.

14. The liquid crystal display device according to claim 8, further comprising a fuse connected in series with a ground voltage in each of the plurality of point light source sets.

* * * * *